US008533072B2

(12) United States Patent
Von Helmolt et al.

(10) Patent No.: US 8,533,072 B2
(45) Date of Patent: Sep. 10, 2013

(54) MULTI-LEVEL GLOGBAL AVAILABLE-TO-PROMISE

(75) Inventors: Hans-Ulrich Von Helmolt, Heidelberg (DE); Michael Picht, Walldorf (DE); Stefan Siebert, Hockenheim (DE)

(73) Assignee: SAP Aktiengesellschaft, Walldorf (DE)

(*) Notice: Subject to any disclaimer, the term of this patent is extended or adjusted under 35 U.S.C. 154(b) by 3848 days.

(21) Appl. No.: 10/308,217

(22) Filed: Dec. 2, 2002

(65) Prior Publication Data

US 2004/0010454 A1   Jan. 15, 2004

Related U.S. Application Data

(60) Provisional application No. 60/395,245, filed on Jul. 10, 2002.

(51) Int. Cl.
*G06Q 10/00* (2012.01)

(52) U.S. Cl.
USPC .......................................................... 705/28

(58) Field of Classification Search
USPC .......................................................... 705/28
See application file for complete search history.

(56) References Cited

U.S. PATENT DOCUMENTS

| | | | | |
|---|---|---|---|---|
| 6,119,102 A * | 9/2000 | Rush et al. | | 705/29 |
| 6,216,109 B1 * | 4/2001 | Zweben et al. | | 705/7.12 |
| 6,594,535 B1 * | 7/2003 | Costanza | | 700/97 |
| 6,947,903 B1 * | 9/2005 | Perry | | 705/28 |
| 7,165,041 B1 * | 1/2007 | Guheen et al. | | 705/26.1 |
| 7,188,075 B1 * | 3/2007 | Smirnov | | 705/7.35 |
| 2002/0099583 A1 * | 7/2002 | Matusek et al. | | 705/7 |
| 2002/0107763 A1 * | 8/2002 | Palmer et al. | | 705/29 |
| 2002/0174023 A1 * | 11/2002 | Grey et al. | | 705/26 |
| 2003/0018547 A1 * | 1/2003 | Steele | | 705/29 |
| 2006/0026048 A1 * | 2/2006 | Kolawa et al. | | 705/7 |

* cited by examiner

*Primary Examiner* — Garcia Ade

(74) *Attorney, Agent, or Firm* — Blakely Sokoloff Taylor & Zafman, LLP

(57) ABSTRACT

A method and a set of computer instructions for filling a customer sales order for a product are described. The method determines the availability of the product. The method determines the components of a product if the product is unavailable. The method determines the availability of the components from one or more suppliers.

20 Claims, 5 Drawing Sheets

Figure 1

|  | Product1 | Product2 | Product3 | Product4 | Product5 | Product6 | " " | " " | " " | .. |
|---|---|---|---|---|---|---|---|---|---|---|
| Location A | 0 | 5 | 6 | 1 | 4 | 8 | ' " | " " | " " | .. |
| Location B | 0 | 2 | 0 | 9 | 0 | 0 | " " | " " | " " | .. |
| Location C | 1 | 0 | 3 | 8 | 6 | 3 | " " | " " | " " | .. |
| Location D | 1 | 9 | 0 | 1 | 2 | 2 | " " | " " | " " | .. |
| Location E | 4 | 1 | 0 | 6 | 2 | 2 | " " | " " | " " | .. |
| Location F | 4 | 9 | 8 | 7 | 1 | 3 | " " | " " | " " | .. |
| Location G | " " | " " | " " | .. | | | | | | |

MULTI-LEVEL GLOGBAL AVAILABLE-TO-PROMISE

CROSS-REFERENCE TO RELATED APPLICATION

This application claims priority to U.S. Provisional Application No. 60/395,245, filed on Jul. 10, 2002, the contents of which are hereby incorporated by reference into this application as if set forth herein in full.

TECHNICAL FIELD

This application relates generally to performing available-to-promise (ATP) checks in a supply chain.

BACKGROUND

A supply chain is a network of facilities and distribution nodes for use in procuring materials, transforming the materials into semi-finished and finished products, and distributing the finished products to customers.

A product typically includes one or more components that are assembled during a manufacturing process. In this context, a component can be any type of item, ranging from basic material (e.g., plastic) used to manufacture the product to an actual component in the product (e.g., a monitor of a desktop computer). Obtaining a sufficient amount of product in a time-efficient manner can require significant planning.

SUMMARY

In general, in one aspect, the invention is directed to a method of filling a customer sales order for a product. The method includes determining the availability of the product, determining, the components of a product if the product is unavailable, and determining availability of the components from one or more suppliers. This aspect may also include one or more of the features set forth below.

The components may be determined based on a hierarchical break-down of a bill of materials that corresponds to the sales order. The availability of one or more substitute components may be determined if one of the components is unavailable. In this regard, if the components are unavailable, the method may also include determining which components are unavailable and determining substitute components for the unavailable components. If the components are unavailable at a primary location, the method may include determining if the components are available at a secondary location. If the components are available at the secondary location, the method may include issuing a stock transfer order to ship available components at the secondary location to the primary location. The method may be performed using one or more (e.g., a set of) rules restricting determination of availability of the product. The rules may be defined based on a master data sheet of a customer.

Other features and advantages of the invention will become apparent from the following description, including the claims and drawings.

DESCRIPTION OF THE DRAWINGS

FIG. 1 is a conceptual view showing multi-level global ATP checks for products and locations.

DESCRIPTION

Figure 2:
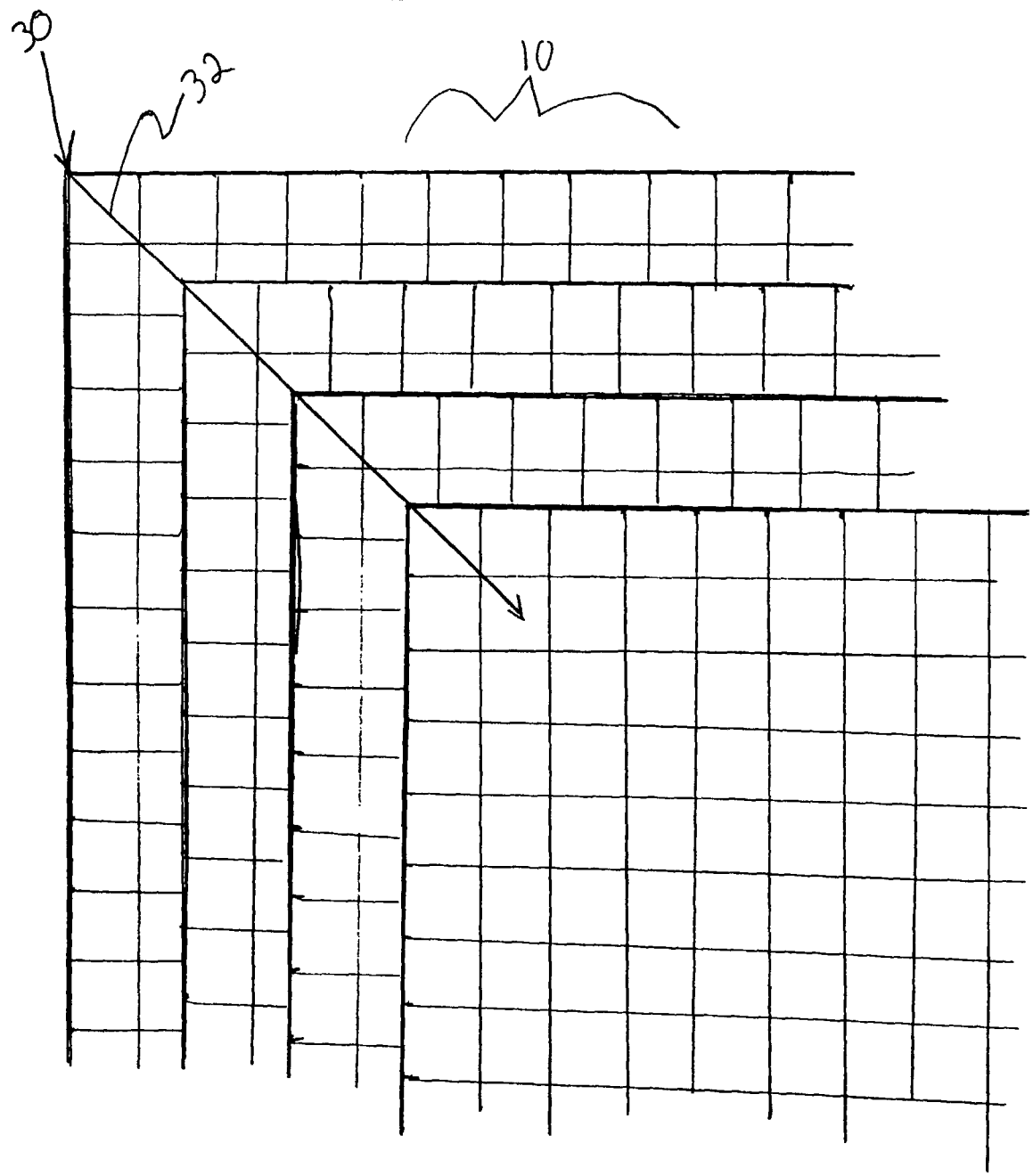
FIG. 2 is a conceptual view showing multi-level global ATP checks for products, locations, and time of availability.

In recent years, some industries have moved to a "madeto-order" or "assemble-to-order" production model. This production model allows customers to select components for inclusion in a final product. The "made-to-order" production model is particularly prevalent in the computer industry. For example, a customer may typically configure his or her own computer, choosing, e.g., a 17-inch monitor, a 40-gigabyte hard drive, and 900-megahertz processor.

To fulfill such orders, a manufacturer needs to identify suppliers for selected components, to assemble the components into the finished product, and to ship the finished product to the customer. In some cases or industries, the entire process may need to be performed in days to weeks.

For large-volume purchases, the logistics of the supply and manufacturing process can be complex. Therefore, obtaining the foregoing information beforehand can make production and distribution flow more smoothly. The system described herein uses multi-level global available-to-promise (ATP) checks to enable a manufacturer (i.e., the component customer) to identify suppliers, to identify an amount of available components at the supplier, to locate the components, and to determine a time at which the components will be available for shipment to the manufacturer.

Multi-Level Global ATP

Generally speaking, an ATP check is a check made, e.g., by a manufacturer, to determine if a product or component is available for shipment. The ATP checks described herein are multi-level in the sense that checks are made at different levels of a bill of materials (BOM) that defines components making up final products, sub-components that make up the components, and so on. The ATP checks are global in the sense that they are performed for various location and products (the final product or a component may be referred to generically as the product being checked).

Multi-level global ATP checks are computer-implemented, meaning that the requisite inputs are provided to computer software and the resulting checks are performed automatically using one or more rules, as described in more detail below. Multi-level global ATP checks may be performed over a network, such as the Internet or a local area network (LAN), e.g., by communicating with a computer system, databases, etc. of a third party, such as a supplier or distributor. Alternatively, multi-level global ATP checks may reference a local database containing all necessary information.

Multi-level global ATP checks have applicability in a number of contexts. In this embodiment, multi-level global ATP checks may be performed in a transportation planning application. The transportation planning application is computer software that contains various features relating to supply chain management. As noted above, supply chain management refers, generally, to managing commerce (e.g., product shipments) between a manufacturer, various intermediaries, such as manufacturing facilities, distribution centers, wholesalers and the like, and customers.

Referring to FIG. 1, multi-level global ATP checks are explained using a spreadsheet 10 having a horizontal axis 12 and vertical axis 14. The spreadsheets described herein are merely constructs that are used to explain multi-level global ATP checks. That is, a computer program performing a multilevel global ATP check performs checks of product and locations; however, the databases that the computer program uses to perform the checks may not have the same structure as the spreadsheets. A computer display may, however, be generated, if desired, along the lines of FIG. 1.

In FIG. 1, horizontal axis 12 includes columns identifying different products 16 (Product1, Product2, etc.). Vertical axis 14 includes rows identifying different locations (LocationA, LocationB, etc.) of products 16. Examples of such locations include factories and warehouses; however, the locations may be any point along a supply chain. Cells 20 at intersections of the rows and the columns contain an amount of a specific product for a specific location. For example, the cell at the intersection of Product2 and LocationB shows the amount (i.e., "2") of Product2 currently at LocationB.

A multi-level global ATP check is equivalent to moving along vertical axis 14 and identifying the amount of a single product available at different locations defined on the vertical axis; and to moving along horizontal axis 12 and identifying the amounts of different products available at a single location defined on the vertical axis.

More complicated scenarios result when moves along vertical axis 14 and horizontal axis 12 are combined. Rules can be stored regarding such moves. These rules may be created based on manufacturer requirements (or customer requirements, but a manufacturer will be used as the example here). Such rules can be fashioned from a master data sheet for the manufacturer or supplied from another source.

In this regard, the master data sheet for a manufacturer may contain information specific to the manufacturer that restricts the supply of a product. For example, a manufacturer may only want product from suppliers within a certain geographical area due to shipping costs and time. Rules may be created from the manufacturer's master data sheet limiting shipments to suppliers within that geographic area. When the rules are executed with regard to the spreadsheet, a zigzag pattern 20 is created on the spreadsheet 10.

In one specific example, a manufacturer may specify the set of following rules:

For LocationA no products;
For LocationB only product 2;
For LocationC only product 3;
For LocationD only product 4;
For LocationE only products 1 and 3;
For LocationF only product 2.

Following these rules results in a zigzag pattern 20 along the spreadsheet 10 that identifies, to the manufacturer (customer), products available based on the specified rules.

Referring to FIG. 2, a third dimension may be added to spreadsheet 10 to take into account available products at specific points in time 30. Each spreadsheet corresponds to products that are available at different points in time. The customer thus may move along Z-axis 32 to identify spreadsheets of products available at specific times. Each spreadsheet contains amounts of products giving the location and type of product available. This allows a customer to identify several types of future or presently available products at a variety of locations in a supply chain.

Rules can also create restrictions based on timing, resulting in a zigzag pattern similar to that shown FIG. 1 (except across three dimensions). The zigzag pattern allows the customer to see only the amounts of products that are at the location and time that concern the customer. A computer display may be generated along the lines of FIG. 2.

Bill of Material (BOM)

Generally speaking, a BOM is a list of parts (or components) that are to be included in a final, or finished, product.

Figure 3:
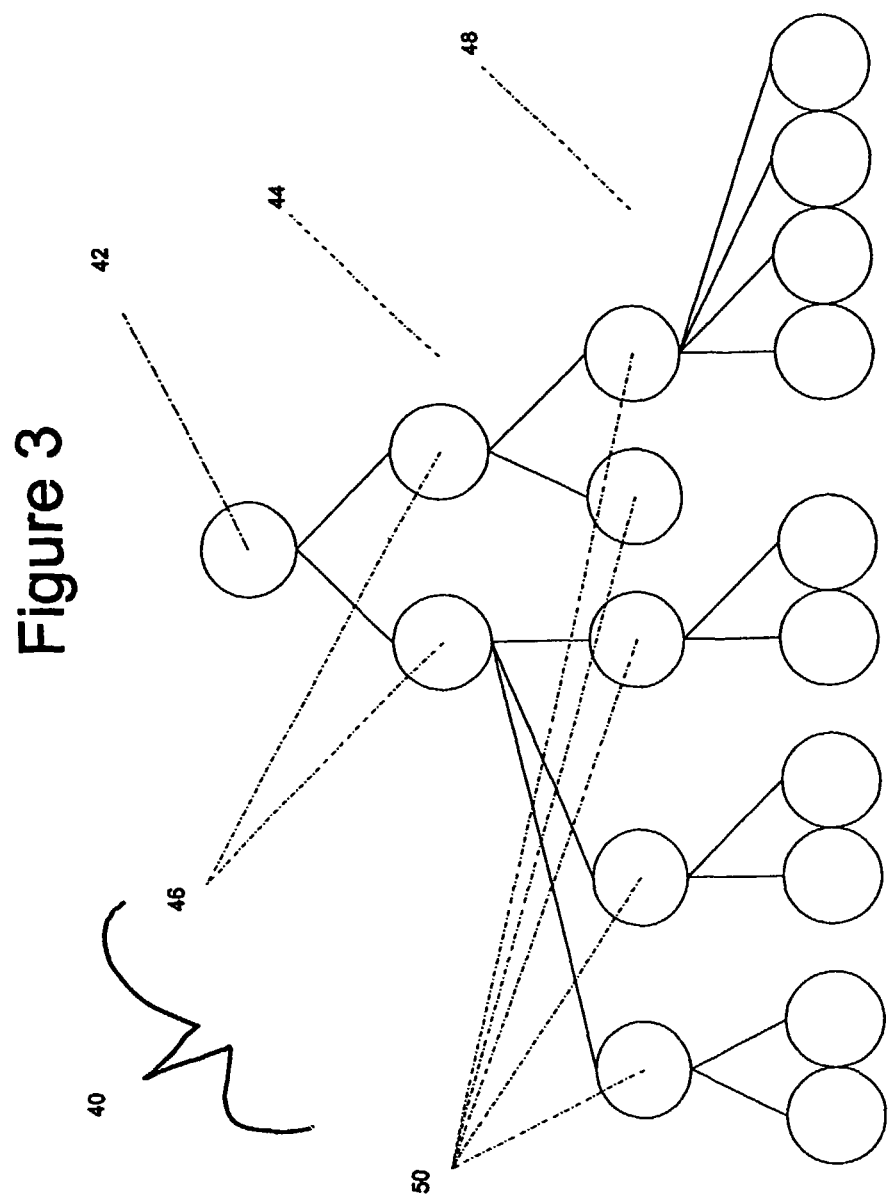
FIG. 3 is a conceptual view showing a hierarchy of information contained in a bill of material for a product.

FIG. 3 shows, conceptually, a hierarchy of information contained in a bill of material for a product.

Referring to FIG. 3, BOM 40 may be viewed as a list of parts that are included in final product 42. BOM 40 is made up of several levels of components. The levels of the components form a pyramid structure, with the completed product 42 on the top of the pyramid.

Below the top of the pyramid is a primary level 44, which contains primary components 46 that are used to make final product 42. Below primary components 46 is a secondary level 48, which contains secondary components 50. Secondary components 50 are used to make primary components 46. The BOM 40 can extend to several levels depending on the break-down of components required to make final product 42.

By way of example, a desktop computer may be the final product. The primary components that make up a desktop computer may include a motherboard, a memory, a hard drive, a keyboard, and a monitor. These components may be located on primary level 44. Structures that make up the primary components, such as storage media in the hard drive, may be located on secondary level 48, and so on.

Using Multi-Level Global ATP with a BOM

A manufacturer can use multi-level global ATP to identify suppliers of available products based on an identity of the product, a location of product, and time of availability of the product. Using the hierarchical structure of the BOM allows the manufacturer to look beyond the availability of the final product. That is, the manufacturer can also identify the availability of components to produce the final product. This allows the manufacturer to identify components that present problems or delay the assembly of the final product. Identifying potential problem components gives the manufacturer the opportunity to find substitute components in order to meet any assembly and delivery schedules.

By way of example, assume that the final product is a desktop computer. The manufacturer may use a multi-level global ATP check to identify that no supplier or manufacturer can produce the required amount of computers, on time, for a particular sales order. The manufacturer may identify that the problem in filling the sales order is, e.g., lack of supply of a 40-gigabyte hard drive. The manufacturer can then substitute the 40-gigabyte hard drive for a different component, such as a 30-gigabyte hard drive or a 60-gigabyte hard drive. Thus, the manufacturer can fill the order on time using the substitute components. Rules may also be provided for determining which components can be substituted, etc.

Stock transfer is another factor that can hinder filling a sales order. Performing a multi-level ATP check allows the manufacturer to identify alternative suppliers for a component that a primary supplier lacks. The manufacturer can then issue a stock transfer request. The stock transfer request instructs the alternative supplier to ship the components to the primary supplier. The primary supplier can then assemble the components and complete the sales order.

Figure 4:
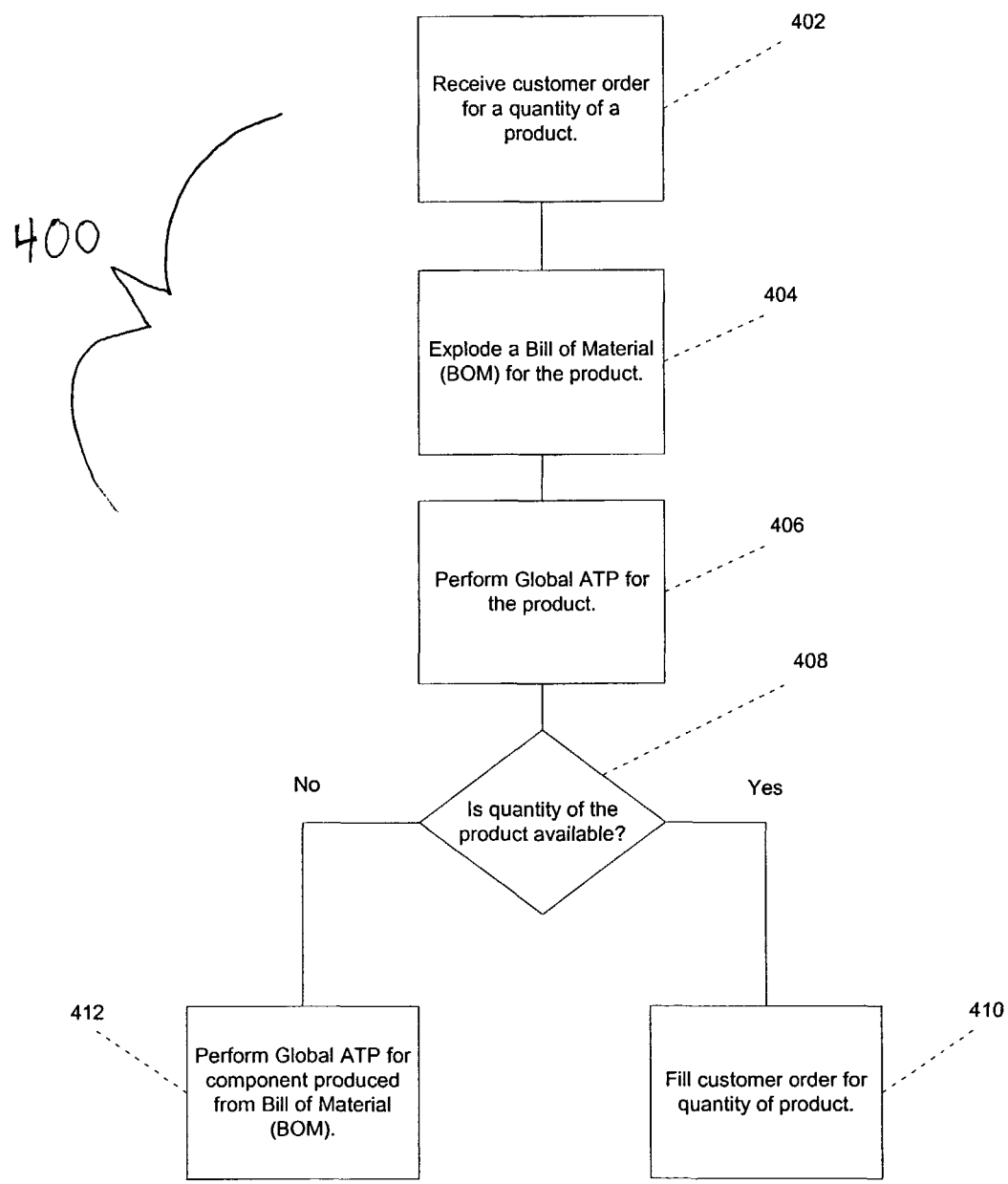
FIG. 4 is a flowchart showing processing of a customer order in connection with a multi-level global ATP check.

FIG. 4 shows a process 400 for using multi-level global ATP checks with a BOM. Process 400 may be performed by the transportation planning application noted above. Process 400 receives (402) a customer's order for a quantity of a product. Process 400 produces a BOM for the product specified in the customer's order. The BOM may be "exploded" (404), meaning that it is broken-down into a hierarchical structure, such as that shown in FIG. 3.

Process 400 "explodes" the BOM on a level-by-level basis, depending upon whether orders for products at each level can be filled. Thus, as described in more detail below, process 400 first explodes the BOM to the primary level, determines if the primary-level products can be obtained and, if not, then explodes the BOM to the secondary level, and so on.

Process 400 performs (406) a multi-level global ATP check to determine availability of the quantity of product specified in the customer's order and BOM. That is, process 400 checks product, location, and time availability, as described above with respect to the spreadsheet of FIG. 3.

If the multi-level global ATP check determines that the quantity of the product is available (408), process 400 fills (410) customer's order. What is meant by "fill" in this context is that the requisite product(s) are allocated for shipment. If the multi-level global ATP check determines that the quantity of the product is not available (408), process 400 proceeds to block 412. In block 412, process 400 performs a multi-level global ATP check for components of the product (see process 500 described in FIG. 5).

Figure 5:
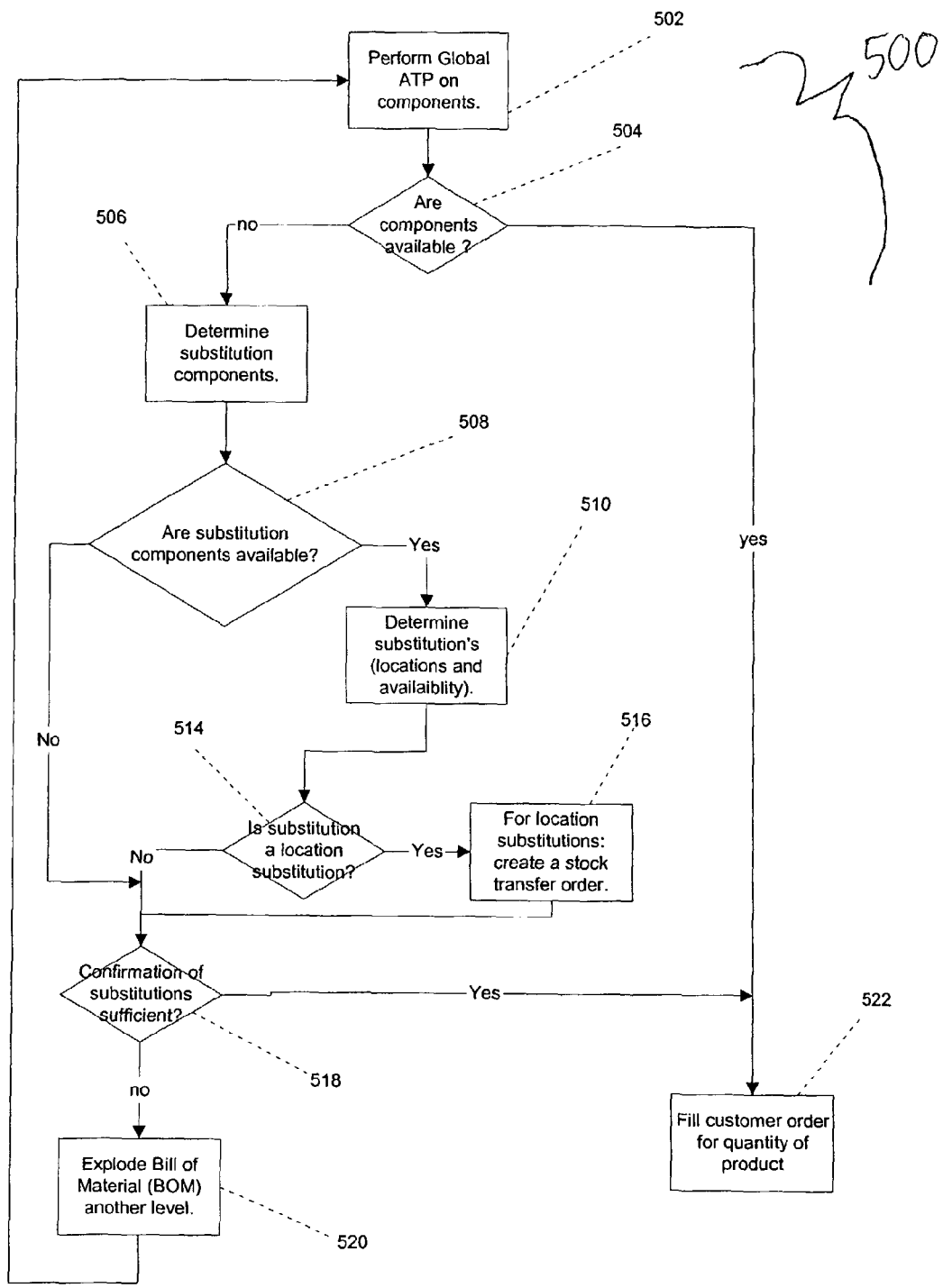
FIG. 5 is a flowchart showing further processing of the customer order in connection with the multi-level global ATP check.

Referring to FIG. 5, process 500 performs (502) a multi-level global ATP check for components that make up the product specified in the BOM. Process 500 determines if all components are available. If all the components are available (504), process 500 fills the customer's order for the quantity of products. What is meant by "fill" in this context is that the requisite product(s) are allocated for shipment.

If the components are not available (504), process 500 identifies (506) substitute components that may be used. The identification of substitute components may be made by referencing rules stored about shipments to the customer that made the initial order. Assuming that substitutions may be made, process 500 determines if substitute components are available. If substitute components are not available (508), process 500 advances to block 518. If substitute components are available (508), process 500 determines (510) the location(s) and availability of the substitute components.

Process 500 determines (514) if the substitute components are from a substitute (i.e., non-primary or "secondary") location. If the substitute components are not from a secondary location (514), process 500 advances to block 518. If the components are from a secondary location (514), process 500 creates (516) a stock transfer order and advances to block 518. The stock transfer order may direct the holder (supplier) of a component at the secondary location to ship the component to the primary location.

Process 500 confirms (518) that the substitute components are sufficient and/or permissible for the customer identified in the BOM. If the customer confirms that the substitution is adequate, process 500 fills (522) the customer order for the product. If the substitution is not adequate, process (500) produces or explodes another level of the BOM and returns to block 502 to check availability of next level components.

Other Embodiments

The multi-level global ATP process is described herein in the context of transportation planning software, which is comprised of executable instructions stored on one or more machine-readable media. These instructions may be executed by one or more processor(s) to perform the functions described above relating to performing multi-level global ATP checks. These functions include performing processes 400 and 500.

It is noted, however, that the multi-level global ATP process described herein (including processes 400 and 500) may find applicability in any computing or processing environment. The multi-level global ATP process may be implemented using hardware, software, or a combination of hardware and software. For example, circuit elements, which may or may not include a microprocessor, logic gates, transistors, and the like, may be used to implement the multi-level global ATP process.

The multi-level global ATP process may be implemented using one or more computer programs executing on one or more programmable computers or other machines that each includes a processor and a storage medium that is readable by the processor (including, but not limited to, volatile and non-volatile memory and/or storage components).

Each such program may be implemented in a high-level procedural or object-oriented programming language to communicate with a computer, system. However, the programs can be implemented in assembly or machine language. The language may be a compiled or an interpreted language.

Each computer program may be stored on a storage medium or other article of manufacture (e.g., CD-ROM, hard disk, or magnetic diskette) that is readable by a general or special purpose programmable computer for configuring and operating the computer when the storage medium or device is read by the computer to run the multi-level global ATP process described herein. The multi-level global ATP process may also be implemented as one or more machine-readable storage media, configured with one or more computer program(s), where, upon execution, instructions in the computer program(s) cause one or more machines to operate in accordance with the multi-level global ATP process described herein.

The multi-level global ATP process not limited to the embodiments described above. For example, the multi-level global ATP process is not limited to use with the specific products described above or to use in connection with supply chain management. Rather, the multi-level global ATP process has universal applicability.

Some blocks shown in the flowchart may be rearranged, substituted, or omitted. As such, operations performed in connection with the multi-level global ATP process are not limited to the flow patterns shown in the flowcharts.

Other embodiments not described herein are also within the scope of the following claims.

What is claimed is:

1. A method by a computer processor of filling a customer sales order for a product, comprising:
   determining, by the computer processor, availability of the product;
   determining components of the product if the product is unavailable; and
   determining, by the computer processor, availability and location of the components from one or more suppliers.

2. The method of claim 1, wherein determining the components comprises determining the components based on a hierarchical break-down of a bill of materials that corresponds to the sales order.

3. The method of claim 1, further comprising:
   determining availability of one or more substitute components if one of the components is unavailable.

4. The method of claim 1, wherein if the components are unavailable, the method further comprises:
   determining which components are unavailable; and
   determining substitute components for the unavailable components.

5. The method of claim 1, wherein if the components are unavailable at a primary location, the method further comprises:
   determining if the components are available at a secondary location.

6. The method of claim 5, further comprising:
   issuing a stock transfer order to ship available components at the secondary location to the primary location.

7. The method of claim 1, further comprising:
defining a set of rules restricting determination of availability of the product.

8. The method of claim 7, wherein defining the set of rules comprises defining the set of rules using a master data sheet of a customer.

9. A machine-readable medium that stores executable instructions to fill a customer sales order for a product, the instructions for causing a machine to:
determine availability of the product;
determine components of the product if the product is unavailable; and
determine availability and location of the components from one or more suppliers.

10. The machine-readable medium of claim 9, wherein determining the components comprises determining the components based on a hierarchical break-down of a bill of materials that corresponds to the sales order.

11. The machine-readable medium of claim 9, further comprising instructions that cause the machine to:
determine availability of one or more substitute components if one of the components is unavailable.

12. The machine-readable medium of claim 9, wherein the machine-readable medium further comprises instructions that are executed if the components are unavailable, the instructions causing the machine to:
determine which components are unavailable; and
determine substitute components for the unavailable components.

13. The machine-readable medium of claim 9, wherein the machine-readable medium further comprises instructions that are executed if the components are unavailable at a primary location, the instructions causing the machine to:
determine if the components are available at a secondary location.

14. The machine-readable medium of claim 13, further comprising instructions that cause the machine to:
issue a stock transfer order to ship available components at the secondary location to the primary location.

15. The machine-readable medium of claim 9, further comprising instructions that cause the machine to:
define a set of rules restricting determination of availability of the product.

16. The machine-readable medium of claim 15, wherein defining the set of rules comprises defining the set of rules using a master data sheet of a customer.

17. An apparatus for filling a customer sales order for a product, the apparatus comprising circuitry to:
determine availability of the product;
determine components of the product if the product is unavailable; and
determine availability and location of the components from one or more suppliers.

18. An apparatus for filling a customer sales order for a product, comprising:
means for determining availability of the product;
means for determining components of a product if the product is unavailable; and
means for determining availability and location of the components from one or more suppliers.

19. The method of claim 1, further comprising:
iteratively analyzing each successive level of a bill of materials for the product until substitute components are found that meet user defined criteria.

20. The method of claim 1, further comprising:
determining availability of the product at a user specified quantity.

* * * * *

UNITED STATES PATENT AND TRADEMARK OFFICE
CERTIFICATE OF CORRECTION

| | | |
|---|---|---|
| PATENT NO. | : 8,533,072 B2 | Page 1 of 1 |
| APPLICATION NO. | : 10/308217 | |
| DATED | : September 10, 2013 | |
| INVENTOR(S) | : Hans-Ulrich Von Helmolt, Michael Picht and Stefan Siebert | |

It is certified that error appears in the above-identified patent and that said Letters Patent is hereby corrected as shown below:

On the Title Page, in Item [54], and in the Specification, Column 1, line 1, in the Title, delete "GLOGBAL" and insert --GLOBAL--.

Signed and Sealed this
Nineteenth Day of November, 2013

Teresa Stanek Rea
*Deputy Director of the United States Patent and Trademark Office*